(12) United States Patent
Tormasov et al.

(10) Patent No.: US 11,249,982 B2
(45) Date of Patent: Feb. 15, 2022

(54) BLOCKCHAIN-BASED VERIFICATION OF MACHINE LEARNING

(71) Applicant: Acronis International GmbH, Schaffhausen (CH)

(72) Inventors: Alexander Tormasov, Moscow (RU); Serguei Beloussov, Costa del Sol (SG); Stanislav Protasov, Moscow (RU)

(73) Assignee: Acronis International GmbH, Schaffhausen (CH)

( * ) Notice: Subject to any disclaimer, the term of this patent is extended or adjusted under 35 U.S.C. 154(b) by 299 days.

(21) Appl. No.: 16/248,986

(22) Filed: Jan. 16, 2019

(65) Prior Publication Data

US 2019/0228006 A1   Jul. 25, 2019

Related U.S. Application Data (60) Provisional application No. 62/619,144, filed on Jan. 19, 2018.

(51) Int. Cl.
*G06F 16/23* (2019.01)
*G06N 20/00* (2019.01)
*G06F 16/22* (2019.01)
*H04L 9/32* (2006.01)

(52) U.S. Cl.
CPC ...... *G06F 16/2379* (2019.01); *G06F 16/2228* (2019.01); *G06F 16/2365* (2019.01); *G06N 20/00* (2019.01); *H04L 9/3239* (2013.01); *H04L 2209/38* (2013.01)

(58) Field of Classification Search
CPC ............. G06F 16/2228; G06F 16/2365; G06F 16/2379; G06N 20/10; G06N 3/08

USPC ......................................................... 707/703
See application file for complete search history.

(56) References Cited

U.S. PATENT DOCUMENTS

| | | | |
|---|---|---|---|
| 9,774,578 B1* | 9/2017 | Ateniese | H04L 9/30 |
| 9,794,074 B2* | 10/2017 | Toll | G06Q 40/04 |
| 10,176,309 B2* | 1/2019 | Tormasov | G06F 21/16 |
| 10,305,694 B2* | 5/2019 | Dix | H04L 9/3247 |
| 10,726,356 B1* | 7/2020 | Zarandioon | G06N 7/005 |
| 10,747,721 B2* | 8/2020 | Jang | G06F 16/1865 |
| 2013/0297379 A1* | 11/2013 | Coleman | G06Q 50/265 |
| | | | 705/7.29 |
| 2016/0028552 A1* | 1/2016 | Spanos | H04L 9/3236 |
| | | | 713/178 |
| 2016/0330034 A1* | 11/2016 | Back | H04L 9/3255 |

(Continued)

*Primary Examiner* — Shahid A Alam (74) *Attorney, Agent, or Firm* — Arent Fox LLP; Michael Fainberg (57) ABSTRACT

Disclosed are systems and method for machine learning and blockchain-based anti-discrimination validation. The described techniques uses a machine learning model to generate a numerical determination associated with a first person based on an input data set associated with the first person. The numerical determination is further based on a corrective module configured to compensate for prohibited discrimination by the machine learning model. The technique generates a blockchain transaction data structure comprising a state of the machine learning model at the time of generating the numerical determination, a copy of the input data set associated with the person, and an indication of a correction by the machine learning model. The blockchain transaction data structure is recorded or published in a blockchain network.

15 Claims, 4 Drawing Sheets

(56) References Cited

U.S. PATENT DOCUMENTS

| | | | |
|---|---|---|---|
| 2017/0031676 A1* | 2/2017 | Cecchetti | H04L 9/12 |
| 2017/0214701 A1* | 7/2017 | Hasan | H04L 63/1491 |
| 2017/0331896 A1* | 11/2017 | Holloway | H04L 9/12 |
| 2018/0183586 A1* | 6/2018 | Bhargav-Spantzel | G06F 21/33 |
| 2018/0240062 A1* | 8/2018 | Crabtree | G06Q 10/063112 |
| 2018/0287790 A1* | 10/2018 | Everett | H04L 9/3239 |
| 2019/0149418 A1* | 5/2019 | Bertsche | G06F 9/445 707/625 |
| 2019/0164153 A1* | 5/2019 | Agrawal | H04L 9/008 |
| 2019/0190719 A1* | 6/2019 | van de Ruit | G06F 21/64 |
| 2019/0287027 A1* | 9/2019 | Franceschini | H04L 9/3239 |
| 2020/0019898 A1* | 1/2020 | Harrison | G06N 20/10 |
| 2020/0134695 A1* | 4/2020 | Avlani | G06Q 30/0268 |
| 2020/0265164 A1* | 8/2020 | Siliprandi | G06F 21/6263 |

\* cited by examiner

BLOCKCHAIN-BASED VERIFICATION OF MACHINE LEARNING

CROSS-REFERENCE TO RELATED APPLICATION(S)

This application claims the benefit of U.S. Provisional Application No. 62/619,144, filed Jan. 19, 2018, which is herein incorporated by reference.

FIELD OF TECHNOLOGY

The present disclosure relates generally to the field of machine learning, more specifically, to systems and methods for using blockchain networks to verify compliance with nondiscrimination policies in machine learning determinations using a blockchain network.

BACKGROUND

Machine learning is a field in computer science that involves algorithms that can learn from and make predictions on data, in contrast to explicit, static program instructions. Machine learning has been employed to perform a wide range of tasks, including email filtering, internet intrusion detection systems and security applications, optical character recognition, and computer vision. Furthermore, the reliance on machine learning and the availability of large amounts of data have led to software being relied upon to provide suggestions or make decisions for, or related to, people. For example, machine learning has used to determine who receives access to financial products (e.g., loan, mortgage, credit ratings), or which job candidates are screened for a position or which employees are considered for a promotion. Machine learning has been even used in various stages of the criminal justice system (e.g., arraignment, sentencing).

For a variety of reasons, machine learning algorithms are susceptible to forms of discrimination and bias, which depending on the use case may be prohibited by law, or are otherwise undesirable to software providers. Such discrimination may include making suggestions or decisions for a person correlated with a protected class or attribute of that person, such as race, color, religion, sex (including pregnancy, gender identity, and sexual orientation), national origin, age, disability, or genetic information.

However, it may be difficult to remove discrimination and bias from such systems, as machine learning and other forms of artificial intelligence are generally considered "black box" systems. In some cases, there is no direct way to influence certain machine learning models, for example, such as neural networks or other complex algorithms, to take this into account. Furthermore, it is desirable to be able to verify that a machine learning model has complied with nondiscrimination requirements or regulations in making a given suggestion or decision.

SUMMARY

According to aspects of the present disclosure, certain dedicated algorithms may be implemented to remove or reduce certain forms of discrimination and bias from machine learning models. In one technique, a test set is provided that defines a level of violation nondiscrimination and a post-correction algorithm is applied that takes a decision from a machine learning model and corrected them based on the test set. In another technique, a dedicated learning is made for the machine learning model to achieve a requested level of nondiscrimination as a correction of the main algorithm.

Aspects of the present disclosure further provide a system for verifying that such corrective operations was performed during training of the machine learning model and/or during the decision-making by the model (e.g., that a corrective algorithm was applied, etc.). This may be used to verify, for example, to a court of law, that there were no discrimination policies implemented.

In one aspect, the described system may use a blockchain to record a current state of a machine learning (ML) model (or neural network, or NN) for evaluation of a particular person, an input for a particular person for ML/NN, and a presence of the correction for ML/NN results related to an additional add-on algorithm running after the main ML/NN algorithm (if present). In general, aspects enable operations that reproduce or recreate the ML/NN decision to verify that they were performed in compliance with nondiscrimination policies. Such correction metadata may include data before correction, input for information, a state of the correction algorithm (if any), and a result of the correction. In case of additional internal training of the ML/NN made before to comply with nondiscrimination requirements and/or an algorithm which was used to verify nondiscrimination compliance (e.g., test set results), the current state of the ML/NN may contain a separate portion which can be used as evidence that original algorithms were tested using a particular sample. Such samples may be different for different persons, or can evolve and change over time. Such samples allow a third-party at a subsequent time to verify compliance of the algorithm ML/NN used based on the output for the selected test set.

Thus, a system and method is disclosed herein for performing machine learning, and, more particularly, for validating anti-discriminatory effects within a machine learning model using a blockchain network.

In one exemplary aspect, a computer-implemented method for performing machine learning is provided. The method includes generating, using a machine learning model, a numerical determination associated with a first person based on an input data set associated with the first person. The numerical determination is further based on a corrective module configured to compensate for prohibited discrimination by the machine learning model. The method further includes generating a blockchain transaction data structure comprising a state of the machine learning model at the time of generating the numerical determination, a copy of the input data set associated with the person, and an indication of a correction by the machine learning model, and recording the blockchain transaction data structure in a blockchain network.

In another aspect, the method further includes receiving a second blockchain transaction data structure from the blockchain network, and validating compliance of a nondiscrimination policy based on the received second transaction.

In another aspect, generating the numerical determination includes determining, by the corrective module, whether an initial output by the machine learning model violates a nondiscrimination policy based on an evaluation data set, and modifying, by the corrective module, the initial output to generate the numerical determination based on a corrective algorithm.

In another aspect, the indication of the correction includes a copy of the initial output by the machine learning model prior to correction, a state of the corrective algorithm, and a result of the corrective algorithm.

In another aspect, the machine learning module is trained using a corrective input data set configured to achieve a requested level of non-discrimination by the machine learning model.

In another aspect, the indication of the correction comprises an indication that the machine learning model has been verified using an evaluation data set subsequent to training using the corrective input data set.

In another exemplary aspect, a system for performing machine learning is provided. The system includes a memory configured to store computer-executable instructions, and a hardware processor coupled to the memory. The hardware processor is configured to execute the instructions to generate, using a machine learning model, a numerical determination associated with a first person based on an input data set associated with the first person. The numerical determination is further based on a corrective module configured to compensate for prohibited discrimination by the machine learning model. The hardware processor is further configured to generate a blockchain transaction data structure comprising a state of the machine learning model at the time of generating the numerical determination, a copy of the input data set associated with the person, and an indication of a correction by the machine learning model, and record the blockchain transaction data structure in a blockchain network.

According to another exemplary aspect, a computer-readable medium is provided comprising instructions that comprises computer executable instructions for performing any of the methods disclosed herein.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product for performing machine learning. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
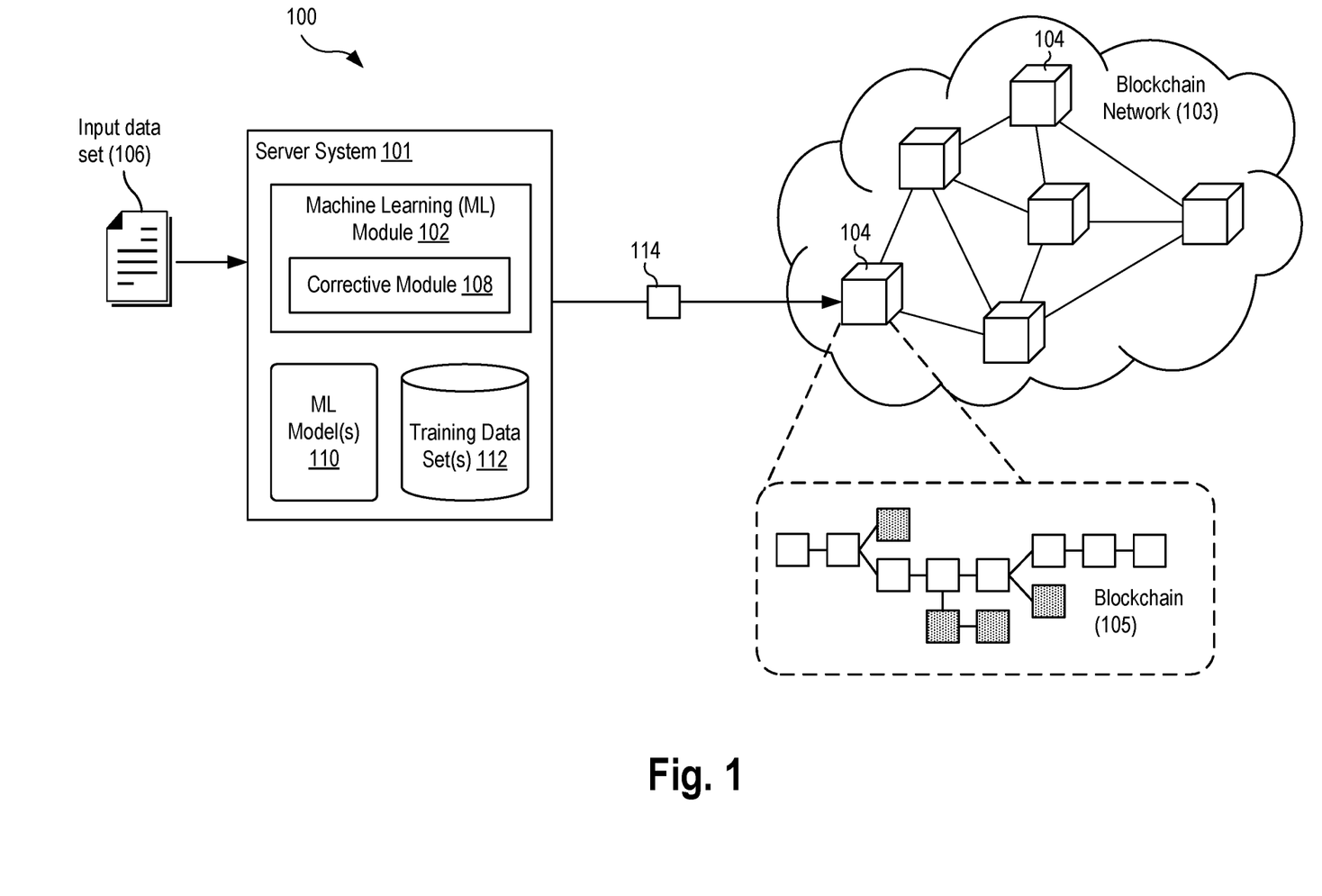
FIG. 1 is a block diagram illustrating a system for performing machine learning according to an exemplary aspect.

FIG. 1 is a block diagram illustrating a system 100 for performing machine learning to an exemplary aspect. The system 100 includes a server system 101 having a machine learning (ML) module 102 communicatively connected to a blockchain network 103 (e.g., by a network). The server system 101 may be any computer, server, desktop, laptop, notebook, smartphone, tablet, portable computing device, virtual machine, or other computing device.

In an aspect, the machine learning module 102 may be configured to generate, using one or more machine learning models 110, a numerical determination associated with a particular person based on an input data set 106 associated with that person. The machine learning models 110 may be trained using a specialized training data set 112. In some aspects, the ML model 110 may be developed using supervised learning techniques to, based on a training data set 112 having a plurality of example inputs and pre-determined desired outputs, develop general rules or functions to map new inputs (such as, input data set 106). In other aspects, the ML model 110 may be developed using unsupervised learning techniques to develop rules or functions that describe an internal structure of a training data set 112 having a plurality of sample (but unlabeled) inputs.

In some aspects, the ML model 110 may be a machine learning classifier configured to output a classification for a given input data set 106 associated with a person. For example, the machine learning module 102 may apply the ML model 110 to a person's input data set 106 (containing for example, their financial records and personal information) and generate an output indicating whether they are allowed or denied a credit loan (that is, "loan" classification or "no loan" classification). In such aspects, the numerical determination generated by the ML model 110 may be from a discrete set of values corresponding to the classification of the person, for example, an integer or binary value.

In some aspects, the ML model 110 may be configured to perform regression analysis that outputs a prediction or probabilistic value for a given input data set 106 associated with a person. For example, in a criminal justice use case, the machine learning module 102 may apply the ML model 110 to a person's input data set 106 and generate a prediction indicating a risk of recidivism by that person. In this example, the numerical determination generated by the ML model 110 may be a continuous value, for example, from 0 to 1. In other examples, the numerical determination generated by the ML model 110 may be a predicted value based on the input data set 106, such as a predicted credit rating or score for a person. In an aspect, the ML models 110 may include one or more models configured to use linear regression, logistic regression, decision trees, support vector machine (SVM), naïve Bayes, K-nearest neighbors (KNN), K-means, Random Forest, dimensionality reduction algorithms, gradient boosting algorithms, artificial neural networks, convolutional neural networks, and other machine learning algorithms, techniques, and schemes, alone or in combination.

According to an aspect, the machine learning module 102 may include a corrective module 108 configured to modify the operations and/or output of the ML model 110 to compensate for prohibited discrimination by the ML model 110. As discussed above, the ML model 110 may be affected by (inadvertent) discrimination or bias related to a protected attribute or class of persons. Such discrimination or bias may result, for example, from training a ML model using training data sets 112 that suffer from selection bias, that perpetuate and reinforce historical biases, that lack information or disproportionally represent certain populations, or that have other issues.

As described in greater detail below, the corrective module 108 may be configured to provide a test data set that defines a level of violation of nondiscrimination policies, and then implements a corrective algorithm which takes the decisions (outputs) from the ML models and corrects them based on the test data set. In another approach, the corrective module 108 may be configured to evaluate and re-train the ML model 110 to achieve a threshold level of nondiscrimination as a correction of the main algorithm of the ML model 110. In some aspects, the corrective module 108 may be configured to modify the internal data structures that comprise the ML model 110, such as the internal nodes of a neural network) so as to correct for discriminatory effects of the ML model 110. In other aspects, the corrective module 108 may be configured to operate on the outputs of the existing AI/ML model 110, i.e., take the decisions from the ML model and correct them based on a corrective dataset.

To verify that such corrective operations were performed during training of the ML model 110 and/or decision-making, the machine learning module 102 may be configured to generate a blockchain transaction data structure 114 having an indication of a correction by the ML model 110 (e.g. that a correction algorithm was applied, etc.). This correction indication may be used at a subsequent time to verify compliance with nondiscrimination policies, for example, by a court of law or regulating body. The machine learning module may be further configured to generate and transmit the blockchain transaction data structure 114 to the blockchain network 103 for recordation in the blockchain ledger.

According to an exemplary network, the blockchain network 103 can be an existing (public or private) distributed network formed from a plurality of peer-to-peer nodes 104 or computers. According to the exemplary aspects, the blockchain network 103 maintains a distributed ledger, also referred to as a blockchain 105. The blockchain 105 is a continuously-growing list of data records hardened against tampering and revision using cryptography and is composed of data structure blocks that hold the data received from other nodes, such as the server system 101.

In one aspect, the server system 101 may transmit data values related to its machine learning results and corrections to the blockchain network 103 as a transaction 114, and the transaction in the blockchain records blocks and confirms when and in what sequence the data transactions enter and are logged in the existing blockchain. Every node 104 in the decentralized system can have a copy of the growing blockchain 105, avoiding the need to have a centralized ledger managed by a trusted third party. Moreover, each of the nodes 104 can validate the data, add hash values to their copy of the blockchain 105, and then broadcast these additions to other nodes in accordance with existing blockchain methodologies.

Figure 2:
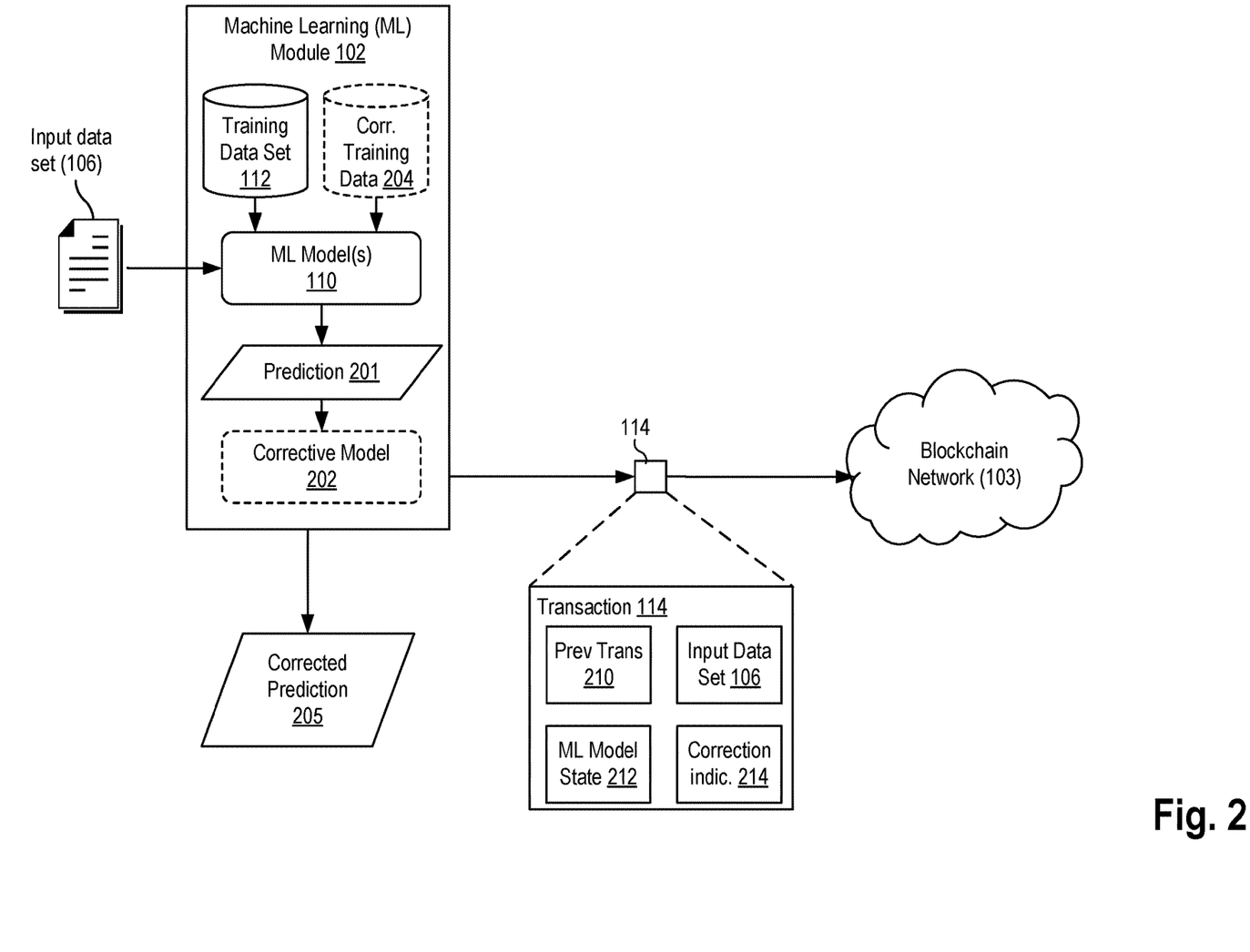
FIG. 2 is a block diagram depicting operations for verifying compliance of a machine learning operation according to an exemplary aspect.

FIG. 2 is a block diagram depicting operations for verifying compliance of a machine learning operation according to an exemplary aspect. In the aspect shown, the machine learning module 102 may be configured to generate a prediction 205 based on application of the ML model 110 to an input data set 106 associated with one or more persons and further based on a corrective module that compensates for discrimination or bias by the ML model 110. The ML model 110 may have been trained by the training data set 112, and as well as by past predictions resulting from prior applications of the ML model 110 (e.g., in the case of reinforcement training).

In one exemplary aspect, the machine learning module 102 may apply the ML model to the input data set 106 to generate an initial output (e.g., an initial prediction 201). Then, the machine learning module 102 may determine whether this initial prediction 201 violates a nondiscrimination policy based on an evaluation data set. If so, the machine learning module 102 may modify the initial prediction 201, using a corrective model 202 (shown in dashed lines), to generate a "corrected" prediction 205 based on a corrective algorithm. In some aspects, the corrective model 202 may provide an offset or coefficient factor to be applied to the initial prediction 201 to calculate the corrected prediction 205. In other aspects, the corrective model 202 may provide a new prediction 205 to replace the initial prediction 201.

In another aspect, the machine learning module 102 may have trained the ML model 110 using a corrective input data set 204 configured to achieve a requested level of nondiscrimination by the ML model 110. In some aspects, the corrective input data set 204 may include a plurality of inputs selected to, when used to train the ML model 110, modify the internal rules of the ML model 110 such that a level of discrimination in relation to a protected attribute (e.g., race) is removed or reduced.

In some aspects, the machine learning module 102 may evaluate a level of discrimination or bias in the one or more ML models 110 using an evaluation data set (e.g., "test set") or an evaluation framework. The machine learning module 102 may compare the determined level of discrimination to check whether it exceeds a threshold value specified by a nondiscrimination policy. If so, the machine learning module 102 may apply the corrective techniques described above. If not, the machine learning module 102 may leave the initial output as the final prediction. In either case, the machine learning module 102 may generate an indication that validates the use of the ML model 110 in generating the prediction 205 as having complied with the nondiscrimination policy.

In one aspect, the machine learning module 102 may generate a blockchain transaction data structure 114 and transmit the transaction to the blockchain network 103. In some aspects, the blockchain transaction data structure may include a field 210 that references a prior transaction data structure, for example, using a cryptographic hash, and an identifier specifying the prediction 205 associated with the transaction data structure. In some aspects, the blockchain transaction data structure 114 may include a plurality of fields, such as a state 212 of the machine learning model at the time of generating the prediction, a copy of the input data set 106 associated with the person, and an indication 214 of a correction by the ML model 110. The state 212 of the ML model 110 may include data values of the internal data structures comprising the ML models encoded or compressed into a serialized format. In one implementation, the state 212 of the ML model 110 includes a plurality of data values contained within interconnected decision tree data structures and/or node tree data structures that implement the ML model 110.

In aspects where the correction to the ML model was the use of a corrective model 202, the indication 214 of the correction may include a copy of the initial output by the machine learning model prior to correction (e.g., prediction 201), a state of the corrective algorithm 202, and a result (prediction 205) of the corrective algorithm 202. In aspects where the correction to the ML model involved a dedicated training using a corrective training data set 204, the indication of the correction may include an indication that the machine learning model has been verified using an evaluation data set subsequent to training using the corrective input data set.

In one or more aspects, at a later time, blockchain transaction data structures may be retrieved from the blockchain network 103, and used to validate compliance of a nondiscrimination policy based on the received second transaction. For example, the state of the ML model 110 and corrective model 202 may be used to re-create the prediction and machine learning output under review.

In one example, a special test sample (data set 106) can be used to define a level of violation of anti-discrimination and then implement a post-correction algorithm, which takes the decisions from the ML model 110 and corrects them based on the special test sample. If it is observed that the generated result does not fall within a necessary deviation from the desired result, then test data can be generated and added to the existing sample data set such that after re-training (using this sample data set), the model passes this test. This testing process may be fixed in the blockchain, so that in case of legal challenges or regulatory audits, the blockchain ledger may be used to determine that the algorithm or ML model does not discriminate or other violate the anti-discrimination regulations based on a test standardized sample. A training data set may be used to train the machine learning algorithm, which at the end, begins to issue a sequence when working out on the reference set. If on this reference set, a breakdown results from a discrimination point of view (that is, there is an algorithm that determines the existence of discrimination in the form of deviation from standard variations), then the described technique may begin to supplement the initial training set by adding additional data to it and training it in order to obtain the desired deviation thresholds.

One example workflow is described herein for verifying non-discrimination of machine learning model, for example, a neural network configured to evaluate a quality of potential borrowers of financial loans. Prior to sending borrowers' data to this neural network, the evaluation parameters used by the neural network are recorded within the blockchain. The parameters are described in digital form, and a hash from this data can be generated and placed within the blockchain. Thus, aspects of the present disclosure provide for immutable, i.e., make sure that the model has not been changed. In addition to providing technology that ensures the model is not improperly changed, aspects of the present disclosure also seek to ensure the model has been tested. An example of this is the presentation of this neural network on these parameters (which are embedded in it) of a sufficiently large test set, in response to which estimates of each element of this set are obtained. Accordingly, to make sure the neural network has already been tested with this test, an entry can be placed in the blockchain that the algorithm was tested on a particular set of data and gave particular rests that all parameters fit into the regulatory framework or tests of non-discrimination given by the relevant rules. Not only is the record about the algorithm itself sent to the blockchain, but also the record about the test data set through which it was passed and verified. Also, the blockchain may further include records that particular special test kits were passed through this neural network, and the results of changes in the machine learning/neural network were recorded in the blockchain.

In another aspect of the present disclosure, the blockchain transaction data structure may be a digital message containing a smart contract module having computer-executable code to be executed by one or more nodes of the blockchain network. The smart contract module is published to the blockchain network 103 and is assigned a particular blockchain address (i.e., contract address). The functionality of the smart contract module may be accessed by subsequent digital messages having a destination address that contains the value of the contract address. The smart contract module may be configured to store, within an internal data store of the smart contract module, the ML model state 212, a correction indication 214, and one or more input data sets 106. In one aspect, the smart contract module may include functionality to update a state of the ML model state 212 recorded within the internal data store of the smart contract module. In some aspects, the smart contract module may further include functionality to validate compliance with anti-discrimination policies using the ML model state 212 and input data set (e.g., data set 106), according to techniques described herein.

Figure 3:
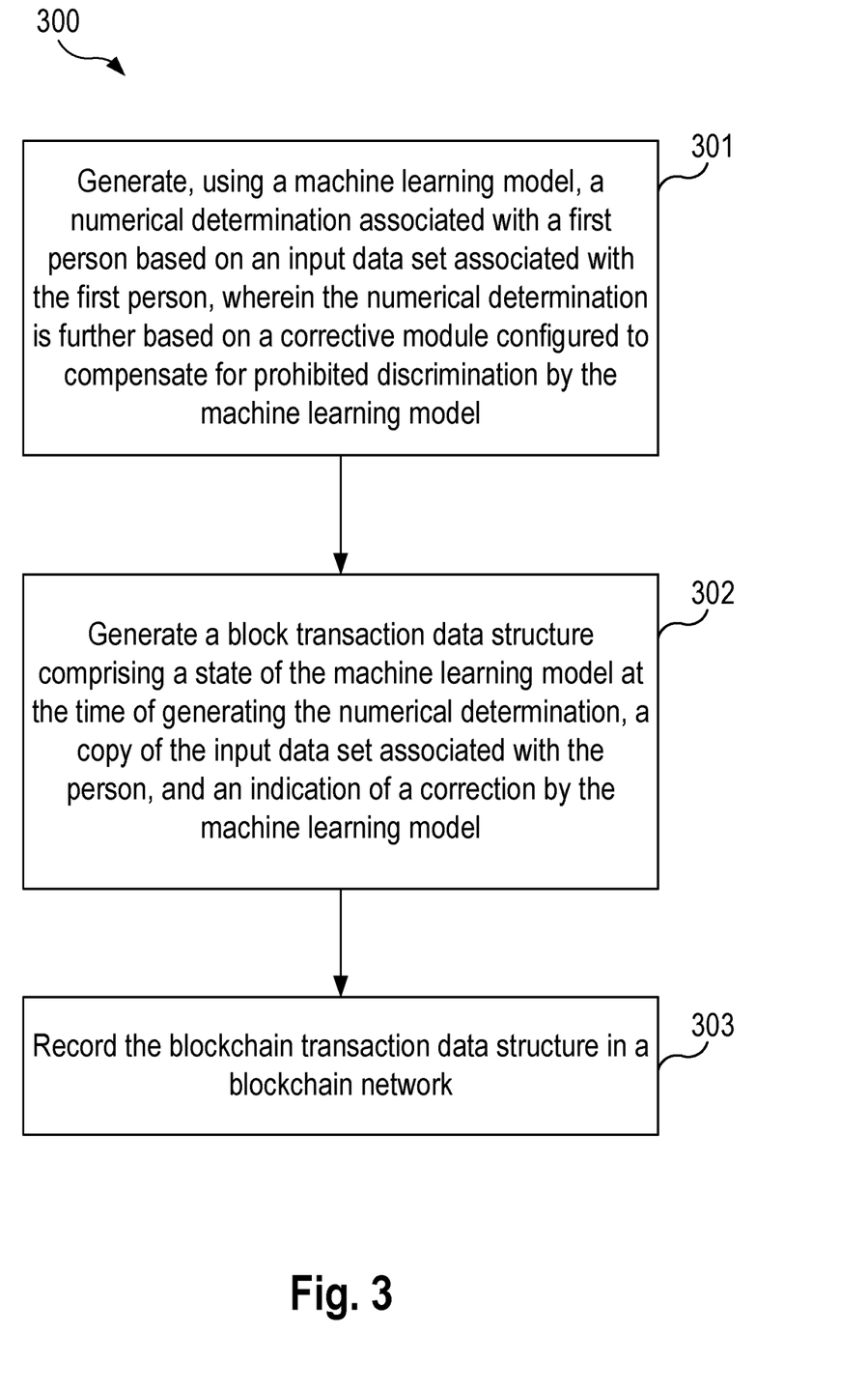
FIG. 3 is a flowchart illustrating a method for performing machine learning according to an exemplary aspect.

FIG. 3 is a flowchart illustrating a method 300 for performing machine learning according to an exemplary aspect. It is noted that the following description of the exemplary method makes reference to the system and components described above.

The method 300 begins at step 301, in which a machine learning module 102 generates, using a machine learning model 110, a numerical determination associated with a first person based on an input data set 106 associated with the first person, wherein the numerical determination is further based on a corrective module 108 configured to compensate for prohibited discrimination by the machine learning model 110.

In some aspects, a corrective module 108 of the machine learning module 102 may determine whether an initial output by the machine learning model violates a nondiscrimination policy based on an evaluation data set. The corrective module 108 may modify the initial output to generate the numerical determination based on a corrective algorithm. In some aspects, the machine learning model is trained using a corrective input data set configured to achieve a requested level of non-discrimination by the machine learning model.

At step 302, the machine learning module 102 may generate a blockchain transaction data structure 114 having a state of the machine learning model at the time of generating the numerical determination, a copy of the input data set associated with the person, and an indication of a correction by the machine learning model. In some aspects, the indication of the correction may include a copy of the initial output by the machine learning model prior to correction, a state of the corrective algorithm, and a result of the corrective algorithm. In some aspects, the indication of the correction comprises an indication that the machine learning model has been verified using an evaluation data set subsequent to training using the corrective input data set.

At step 303, the machine learning module 102 may record the blockchain transaction data structure in a blockchain network 103. In some aspects, the machine learning module 102 may receive a second blockchain transaction data structure from the blockchain network 103, and validate compliance of a nondiscrimination policy based on the received second transaction data structure.

Figure 4:
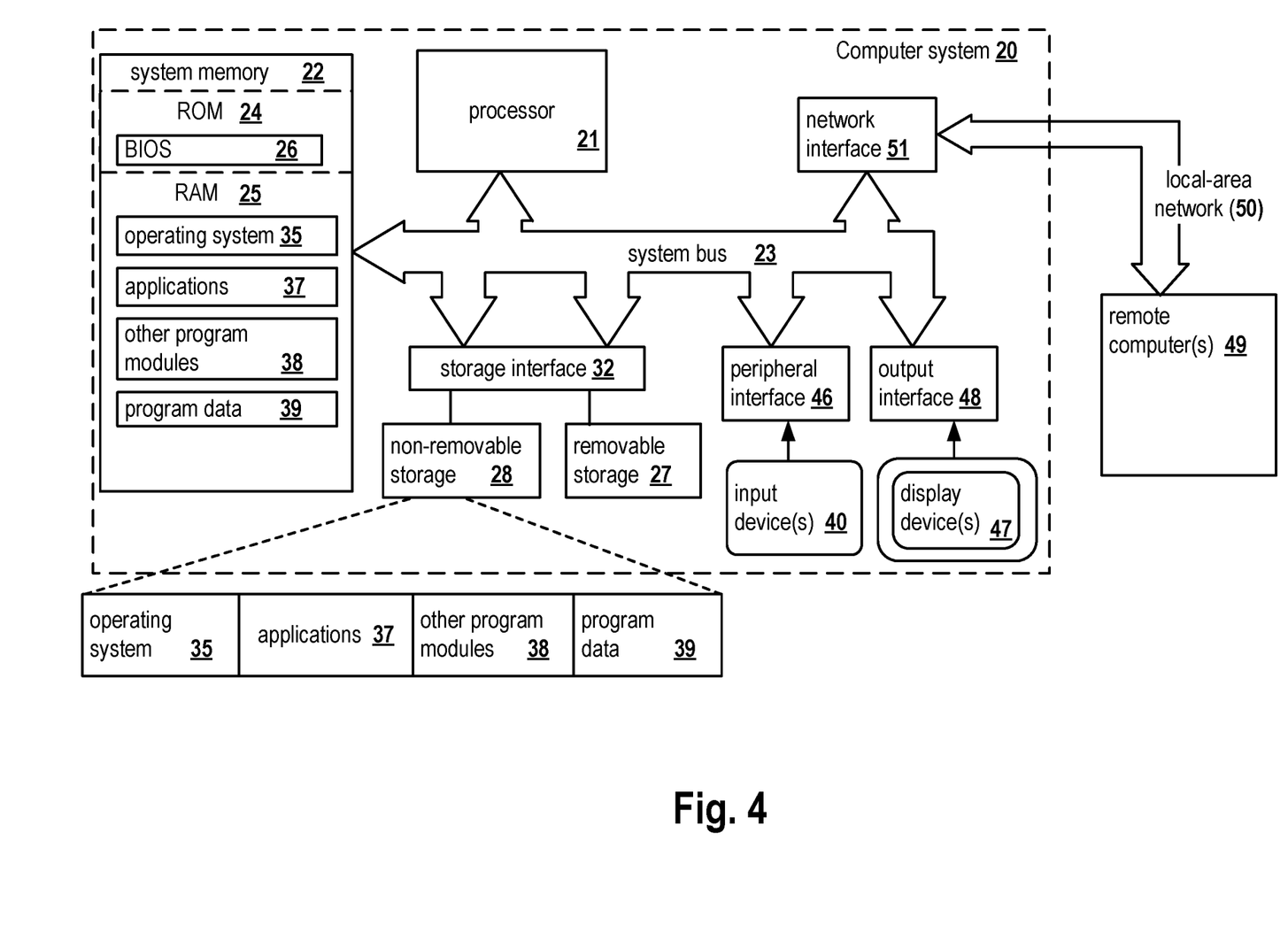
FIG. 4 is a block diagram of a computer system on which the disclosed system and method can be implemented according to an exemplary aspect.

FIG. 4 is a block diagram illustrating a computer system 20 on which aspects of systems and methods for performing machine learning and correction may be implemented in accordance with an exemplary aspect. It should be noted that the computer system 20 can correspond to server system 101, for example, described earlier. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, $I^2C$, and other suitable interconnects. The central processing unit 21 (also referred to as a processor) can include a single or multiple sets of processors having single or multiple cores. The processor 21 may execute one or more computer-executable code implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, static random access memory (SRAM), dynamic random access memory (DRAM), zero capacitor RAM, twin transistor RAM, enhanced dynamic random access memory (eDRAM), extended data output random access memory (EDO RAM), double data rate random access memory (DDR RAM), electrically erasable programmable read-only memory (EEPROM), NRAM, resistive random access memory (RRAM), silicon-oxide-nitride-silicon (SONOS) based memory, phase-change random access memory (PRAM); flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system (such as the one described in greater detail in FIG. 4, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed is:

1. A computer-implemented method for performing machine learning, comprising:
    generating, using a machine learning model, a numerical determination associated with a first person based on an input data set associated with the first person,
    wherein the generating comprises compensating for prohibited discrimination by the machine learning model using a corrective module that compensates by:
        determining whether an initial output by the machine learning model violates a nondiscrimination policy based on an evaluation data set; and
        modifying the initial output to generate the numerical determination using a corrective algorithm in response to determining that the initial output violates the nondiscrimination policy;
    generating a blockchain transaction data structure comprising a state of the machine learning model at the time of generating the numerical determination, a copy of the input data set associated with the first person, and an indication of a correction by the machine learning model; and
    recording the blockchain transaction data structure in a blockchain network.

2. The method of claim 1, further comprising:
    receiving a second blockchain transaction data structure from the blockchain network; and
    validating compliance of a nondiscrimination policy based on the received second transaction.

3. The method of claim 1, wherein the indication of the correction comprises a copy of the initial output by the machine learning model prior to correction, a state of the corrective algorithm, and a result of the corrective algorithm.

4. The method of claim 1, wherein the machine learning module is trained using a corrective input data set to achieve a requested level of non-discrimination by the machine learning model.

5. The method of claim 4, wherein the indication of the correction comprises an indication that the machine learning model has been verified using an evaluation data set subsequent to training using the corrective input data set.

6. A system for performing machine learning, comprising:
    a memory configured to store computer-executable instructions; and
    a hardware processor coupled to the memory and configured to execute the instructions to:
        generate, using a machine learning model, a numerical determination associated with a first person based on an input data set associated with the first person, wherein the generating comprises compensating for prohibited discrimination by the machine learning model using a corrective module that compensates by:
- determining whether an initial output by the machine learning model violates a nondiscrimination policy based on an evaluation data set; and
- modifying the initial output to generate the numerical determination using a corrective algorithm in response to determining that the initial output violates the nondiscrimination policy;

generate a blockchain transaction data structure comprising a state of the machine learning model at the time of generating the numerical determination, a copy of the input data set associated with the first person, and an indication of a correction by the machine learning model; and record the blockchain transaction data structure in a blockchain network.

7. The system of claim 6, wherein the hardware processor is further configured to:
- receive a second blockchain transaction data structure from the blockchain network; and
- validate compliance of a nondiscrimination policy based on the received second transaction.

8. The system of claim 6, wherein the indication of the correction comprises a copy of the initial output by the machine learning model prior to correction, a state of the corrective algorithm, and a result of the corrective algorithm.

9. The system of claim 6, wherein the machine learning module is trained using a corrective input data set to achieve a requested level of non-discrimination by the machine learning model.

10. The system of claim 9, wherein the indication of the correction comprises an indication that the machine learning model has been verified using an evaluation data set subsequent to training using the corrective input data set.

11. A non-transitory computer readable medium comprising computer executable instructions for performing machine learning, including instructions for:

generating, using a machine learning model, a numerical determination associated with a first person based on an input data set associated with the first person,
wherein the generating comprises compensating for prohibited discrimination by the machine learning model using a corrective module that compensates by:
- determining whether an initial output by the machine learning model violates a nondiscrimination policy based on an evaluation data set; and
- modifying the initial output to generate the numerical determination using a corrective algorithm in response to determining that the initial output violates the nondiscrimination policy;

generating a blockchain transaction data structure comprising a state of the machine learning model at the time of generating the numerical determination, a copy of the input data set associated with the first person, and an indication of a correction by the machine learning model; and recording the blockchain transaction data structure in a blockchain network.

12. The non-transitory computer readable medium of claim 11, further comprising instructions for:
- receiving a second blockchain transaction data structure from the blockchain network; and
- validating compliance of a nondiscrimination policy based on the received second transaction.

13. The non-transitory computer readable medium of claim 11, wherein the indication of the correction comprises a copy of the initial output by the machine learning model prior to correction, a state of the corrective algorithm, and a result of the corrective algorithm.

14. The non-transitory computer readable medium of claim 11, wherein the machine learning module is trained using a corrective input data set to achieve a requested level of non-discrimination by the machine learning model.

15. The non-transitory computer readable medium of claim 14, wherein the indication of the correction comprises an indication that the machine learning model has been verified using an evaluation data set subsequent to training using the corrective input data set.

* * * * *